(12) United States Patent
Koyanagi

(10) Patent No.: US 7,249,612 B2
(45) Date of Patent: Jul. 31, 2007

(54) MOUNTING STRUCTURE OF AN OPEN/CLOSE VALVE IN A SEALED BODY

(75) Inventor: Yoshihiro Koyanagi, Kashiwara (JP)

(73) Assignee: Kashiwara, Seitai Co., Ltd., Osaka (JP)

( * ) Notice: Subject to any disclaimer, the term of this patent is extended or adjusted under 35 U.S.C. 154(b) by 188 days.

(21) Appl. No.: 10/504,908

(22) PCT Filed: Nov. 22, 2002

(86) PCT No.: PCT/JP02/12217

§ 371 (c)(1),
(2), (4) Date: Aug. 18, 2004

(87) PCT Pub. No.: WO2004/048077

PCT Pub. Date: Jun. 10, 2004

(65) Prior Publication Data

US 2005/0109411 A1    May 26, 2005

(51) Int. Cl.
*F16K 15/14* (2006.01)
*B65D 30/26* (2006.01)

(52) U.S. Cl. .............. 137/846; 137/843; 156/290; 383/3; 383/44

(58) Field of Classification Search ........... 137/843, 137/844, 846; 156/290; 383/3, 44
See application file for complete search history.

(56) References Cited

U.S. PATENT DOCUMENTS

| | | | |
|---|---|---|---|
| 3,807,118 A | 4/1974 | Schneider et al. | |
| 4,708,167 A | 11/1987 | Koyanagi | |
| 4,850,912 A | 7/1989 | Koyanagi | |
| 5,209,264 A | 5/1993 | Koyanagi | |
| 5,308,163 A | 5/1994 | Abe | |
| 5,388,910 A | 2/1995 | Koyanagi | |
| 5,460,200 A | 10/1995 | Glicksman | |
| 5,469,966 A | 11/1995 | Boyer | |
| 5,540,500 A | 7/1996 | Tanaka | |
| 5,927,336 A | 7/1999 | Tanaka et al. | |
| 6,067,778 A | 5/2000 | Yamamoto et al. | |
| 6,827,099 B2 * | 12/2004 | Tanaka et al. | 137/255 |
| 2004/0265523 A1 | 12/2004 | Koyanagi et al. | |

FOREIGN PATENT DOCUMENTS

| | | |
|---|---|---|
| FR | 1.348.079 A | 1/1964 |
| GB | 1 504 157 A | 3/1978 |
| JP | 1-164142 | 11/1989 |
| JP | 5-95851 U | 12/1993 |
| JP | 10-000706 A | 1/1998 |
| JP | 2000-218718 A | 8/2000 |
| JP | 2001-010644 A | 1/2001 |
| WO | WO-95/18008 A1 | 7/1995 |

* cited by examiner

*Primary Examiner*—Ramesh Krishnamurthy
(74) *Attorney, Agent, or Firm*—Birch, Stewart, Kolasch & Birch, LLP

(57) ABSTRACT

Provided is a mounting structure of an open/close valve in a sealed body, wherein the open/close valve 2 mounted in the sealed body comprising soft resin sheets and allowing air to be filled therein is stuck on one sheet constituting the expansion part 12 of the sealed body and is not stuck on the other sheet. Even when the expansion part 12 is filled with air, the open/close valve 2 is always fitted closely to the sheet constituting the expansion part 12, whereby the open/close valve 2 may not wrinkle and air may not leak through an air passage of the open/close valve 2.

4 Claims, 7 Drawing Sheets

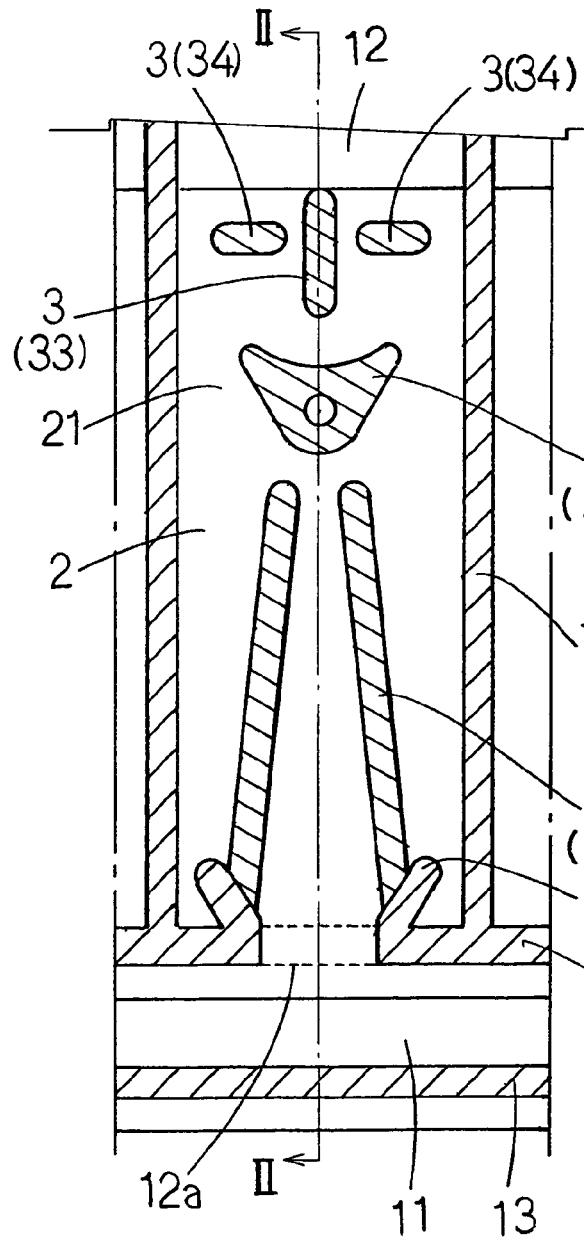
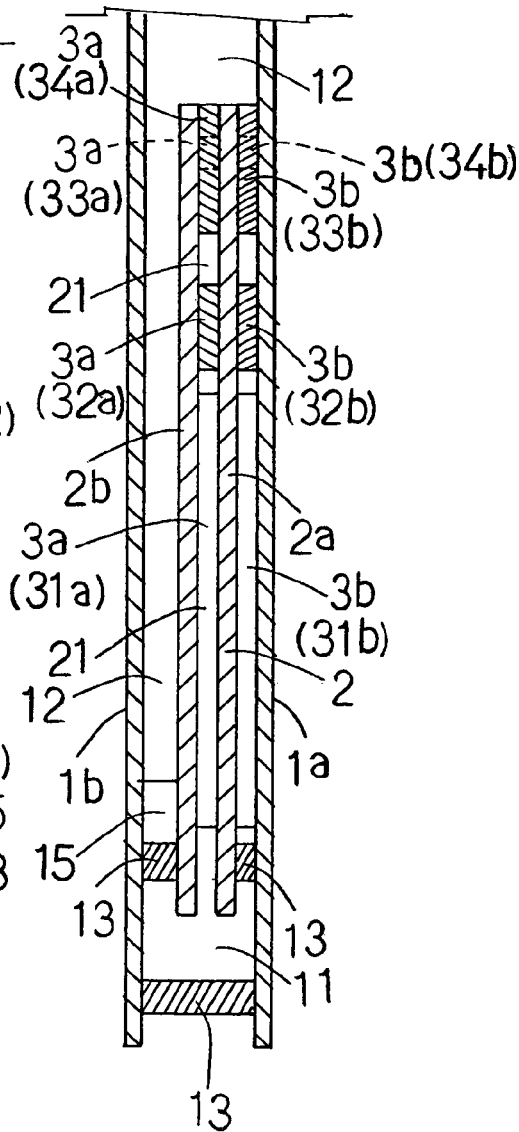
FIG 2 (A)   FIG 2 (B)

MOUNTING STRUCTURE OF AN OPEN/CLOSE VALVE IN A SEALED BODY

BACKGROUND OF THE INVENTION

1. Field of the Invention

The present invention relates to a mounting structure of an open/close valve in a sealed body used for a cushioning material and the like and a device for manufacturing a sealed body with the open/close valve.

2. Description of the Background Art

There have been types of a sealed body with a cushioning effect by filling air therein, being used as a cushioning material and the like. For example, they are "Sealed bag for fluid" by Japanese Utility Model Application Laid Open No. H01-164142, and "Cushioning material sheet," which is a product of an apparatus published under WO95/18008.

These bags are something like a sealed bag 101, as shown in FIG. 7, that includes an expansion part 102 expanding with air filled therein, and an open/close valve 103 communicating the inside of the expansion part 102 and the outside of the sealed bag 101. These are made of soft resin sheets and sectioned by a bonded portion 104 by way of heat-sealing or the like.

The open/close valve 103 forms a flat air passage 103a in a manner sandwiched by the opposite sheets. As shown in FIG. 7(A), when the sheets are separated, the air passage 103a is left opened so that air may flow therethrough. On the contrary, as shown in FIG. 7(B), when the sheets are fitted closely each other, the air passage 103a is closed and air will not flow therethrough.

Herein, as for fixing of said open/close valve 103 to the expansion part 102 in the above-described sealed bag 101, it is usually done only by the bonded part 104 to seal the expansion part 102 and the open/close valve 103. That is, only both sides of the air passage 103a in the open/close valve 103 are fixed to the expansion part 102, while an intermediate part of the valve 103 is not fixed to anywhere.

And, with the expansion part 102 not filled with air, as shown in FIG. 7(D), the sheets of the expansion part 102 and the ones of the open/close valve 103 are respectively laid one on top of another.

On contrary, with the expansion part 102 filled with air, the sheets of the expansion part 102 remain arched, as shown in FIG. 7(E). Thus, as for an interval between the bonded part 104 becomes shorter compared to a situation prior to air-filling, whereby the open/close valve 103 becomes loose, having wrinkles there. Since this causes crumples on the open/close valve 103, the air passage 103a may be left open at its crumpled portion, through which the air in the expansion part 102 leaks to the outside of the sealed body 101.

In view of the above-mentioned problem, the present invention provides an open/close valve which can avoid air leakage even when the expansion part is filled with air.

SUMMARY OF THE INVENTION

To solve the above-mentioned problems, a first aspect of the present invention provides a mounting structure of an open/close valve in a sealed body, wherein the open/close valve 2 is mounted in the sealed body 1 comprising two soft resin sheets 1a, 1b and allowing air to be filled therein, thereby being able to communicate the inside and outside of the sealed body 1 through an air passage 21 formed in the open/close valve 2, wherein the open/close valve 2, by overlying and partially bonding opposite soft resin sheets 2a, 2b, forms the air passage 21 in a manner sandwiched by these sheets 2a, 2b, and the air passage 21 is closable by close fitting of the sheets 2a, 2b, and a static seal part 3b is formed in the open/close valve 2, and the open/close valve 2 is laid upon one sheet 1a constituting the sealed body 1 and bonded thereto at the static seal part 3b, while not bonded to the other sheet 1b at the static seal part 3b.

In accordance with the first aspect of the present invention, an open/close valve 2 may always fit closely to one sheet 1a constituting the sealed body 1 even when the sealed body 1 is filled with air. As a result of it, the open/close valve 2 securely contacts the one sheet 1a, and, since the contacting open/close valve 2 as such is pressed to said sheet 1a by air pressure inside the sealed body 1, wrinkles through which air can leak will not occur on the open/close valve 2, whereby the air passage 21 is effectively closed.

A second aspect of the present invention provides the mounting structure of the open/close valve in a sealed body, as defined in the first aspect of the present invention, wherein a static seal part 3 acts as a means 3a of forming the air passage 21 so as to bypass and guide air passing through the open/close valve 2, not only as a means 3b of bonding the open/close valve 2 to the sheet 1a constituting the sealed body 1.

In accordance with the second aspect of the present invention, the static seal part 3 is supposed to bypass and guide the air-flow passing through the air passage 21 of the open/close valve 2, and, making the configuration of the static seal part 3 for an air-flow in the direction to coming into the sealed body 1 to pass easily and otherwise for an air-flow in the reverse direction to by bypassed and guided, not to pass easily, may let the air pass in the air passage 21 smoothly and let the reverse air-flow hardly occur.

A third aspect of the present invention provides the mounting structure of the open/close valve in a sealed body, as defined in either of the first or second aspect of the present invention, wherein the open/close valve has a valve body sheet 2c between the opposite sheets 2a, 2b to open and close the air passage 21.

In accordance with the third aspect of the present invention, in addition to an advantage that wrinkles through which air in the bag may leak are prevented from occurring on the open/close valve 2, since the valve sheet 2c effectively closes the air passage 21, a mounting structure of the open/close valve where air leakage is hard to be taken place can be provided.

A fourth aspect of the present invention provides a device for manufacturing a sealed body with an open/close valve, wherein the open/close valve 2 is mounted in the sealed body 1 comprising two soft resin sheets 1a, 1b and allowing air to be filled therein, thereby being able to communicate the inside and outside of the sealed body 1 only through an air passage 21 formed in the open/close valve 2, comprising means 51, 54 for feeding in a longitudinal direction L two strips of bag sheets 1a, 1b for forming a sealed body 1 and two strips of valve sheets 2a, 2b for forming an open/close valve 2, the valve sheets being smaller than the bag sheets 1a, 1b in width; a means 53 for forming part of the air passage 21 in the open/close valve 2 by overlying and bonding the bag sheet 1a and the valve sheets 2a, 2b; and means 55, 56 for forming seals 13, 14 to seal the sealed body 1 and the air passage 21 in the open/close valve 2 except for a position of the open/close valve 2 by overlying and bonding the other bag sheet 1b on the side of the one bag sheet 1a, the side where the valve sheets 2a, 2b are attached.

In accordance with the fourth aspect of the present invention, a device for manufacturing a sealed body with an open/close vale that may avoid air leakage through the air passage 21 of the open/close valve 2 can be provided.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2(A) is an enlarged explanatory view of the main part of the open/close valve in the sealed body with open/close valves of this embodiment, and FIG. 2(B) is a cross section view taken along a line II-II of FIG. 2(A).

DETAILED DESCRIPTION OF THE INVENTION

Figure 1:
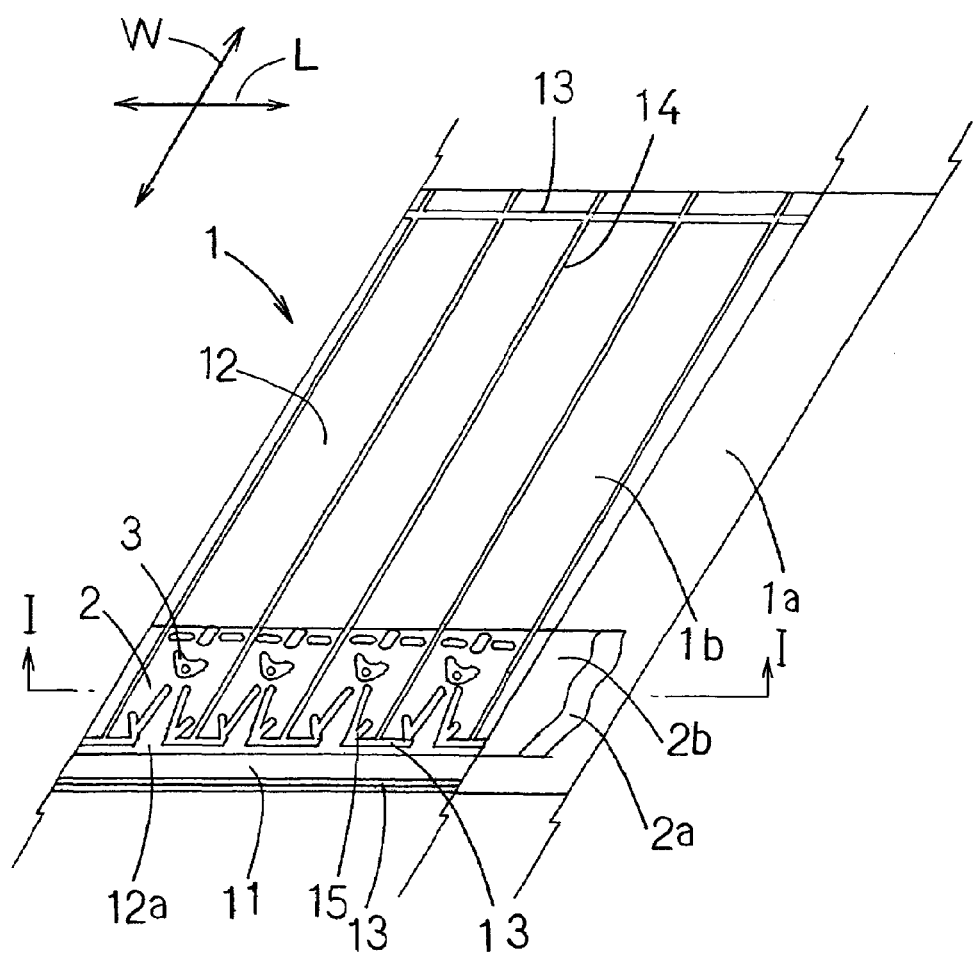
FIG. 1 is a perspective view showing a sealed body with open/close valves in accordance with an embodiment of the present invention.
Figure 4:
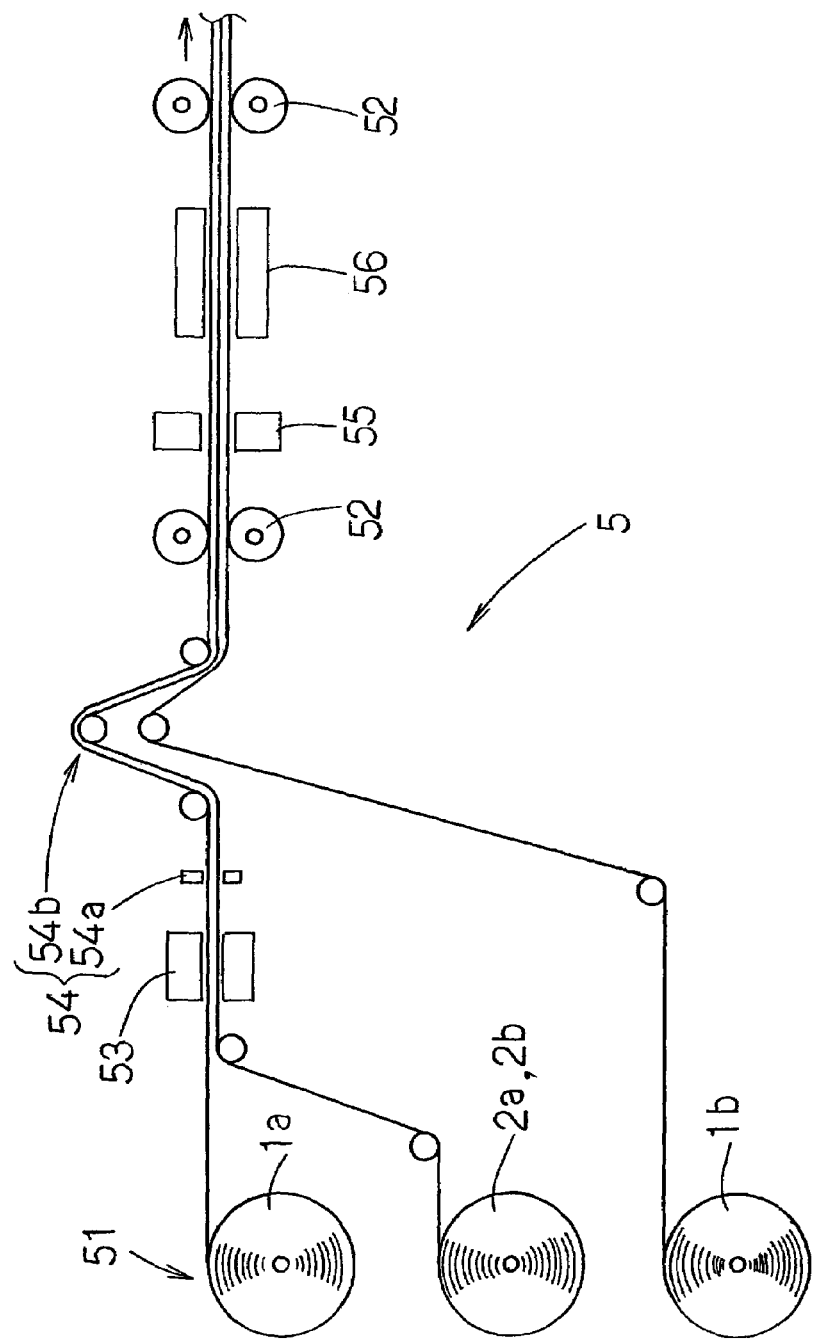
FIG. 4 is a schematic explanatory view of the structure of a device for manufacturing a sealed body of this embodiment.

Hereinafter, embodiments, by way of example, of a mounting structure of an open/close valve for a sealed body and a device for manufacturing the sealed body with the open/close valve in accordance with the present invention will be described with reference to the drawings. FIG. 1 is a perspective view showing a sealed body with open/close valves in accordance with an embodiment of the present invention, and FIGS. 2(A) and 2(B) are enlarged explanatory view of the main part of the open/close valve in the sealed body with open/close valves of this embodiment, and FIG. 4 is a schematic explanatory view of the structure of a device for manufacturing a sealed body of this embodiment.

As shown in FIG. 1, a sealed body 1 of this embodiment comprises bag sheets 1a, 1b placed opposite and on top of another, and valve sheets 2a, 2b placed opposite and on top of another, all of them being strip-like soft resin sheets and constant in width in a crosswise direction W and applied to heat-sealing and the like for sectioning, whereby an air introduction passage 11 and an expansion parts are formed between the bag sheet 1a and the other bag sheet 1b (the valve sheets 2a, 2b shall be explained later.)

In this embodiment, an air introduction passage 11 in the sealed body 1 is an elongate path extending in the direction L and the expansion part 12 communicating to the air introduction passage 11 branches off at the passage 11 in the crosswise direction W.

Without provision of said air introduction passage 11, an expansion part 12 is so varied in arrangement that air can be introduced directly into the expansion part 12.

The expansion part 12 having a strip-like shape extending in the crosswise direction W is sectioned by side seal part 13 and crosswise seal part 14, and a plurality of the expansion parts 12 are disposed in parallel in the direction L.

In this embodiment, an expansion part 12 is identical to each other in shape as viewed from the top, which arrangement may not be restricted to this. For example, the expansion part 12 may be made different in their respective width in the direction L, and other changes can be applied.

As indicted, the sealed body 1 in this embodiment is provided with a plurality of expansion parts 12, which, however, may not be restricted to this, but composed of a single expansion part 12 as a sealed body 1.

In this embodiment, one of the sides of the expansion part in the crosswise direction W communicates to the air introduction passage 11 as an air inlet 12a, while the other side thereof is closed by the side seal 13. By thus, air can be filled in the expansion part 12 via the air inlets 12a through the air instruction passage 11.

Also, as shown in FIG. 2, reinforcing seals 15 are provided around the air inlet 12a. This is a pair of seals extending outward from the air inlet 12a so as to sandwich the air inlet 12a, whereby the border area between the air introduction passage 11 and the expansion part 12 may be reinforced to prevent the expansion part 12 from bursting in filling air in the expansion part 12. In the present invention, this reinforcing seal 15 is not necessarily provided and may be omitted.

And, around the air inlet 12a in the expansion part 12, an open/close vale 2 is formed with the valve sheets 2a, 2b slipped between the bag sheets 1a and 1b by way of bonding the four sheets by the side seal 13 and the crosswise seal 14. That is, the open/close valve 2 is formed inside the expansion part 12.

Also, the open/close valve 2 is securely fixed to a bag sheet 1a by a bag-side static seal part 3b of the static seal part 3, which shall be detailed afterward.

Herein, the valve sheets 2a, 2b, as compared with the bag sheets 1a, 1b, are made smaller in the measurement of its length extending in the crosswise direction W.

The open/close valve 2 has a flat tubular air passage 21 formed between the valve sheets 2a, 2b, both sheets being of soft quality, thereby being able to let air flow from the air introduction passage 11 to the expansion part 12 via the air passage 21.

And, the air passage 21 can be closed by the valve sheets 2a, 2b that are fitted closely. The performance of the open/close valve 2 as a valve is attributed to the air passage 21 being operable to open and close.

Figure 3:
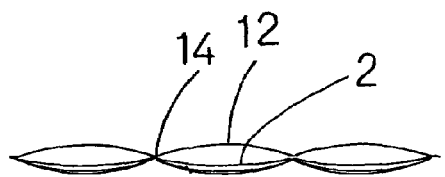
FIG. 3 is a cross section view indicative of a part of the open/close valve in the sealed body with of open/close valves of this embodiment, FIG. 3(A) showing a state where an expansion part is not filled with air, FIG. 3(B) showing a state where an expansion part is filled with air, and FIG. 3(C) being a cross section view taken along a line III-III of FIG. 3(B).
Figure 3:
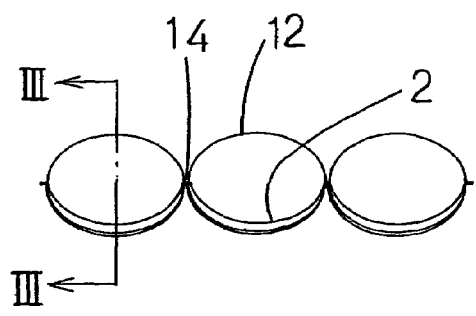
Figure 3:
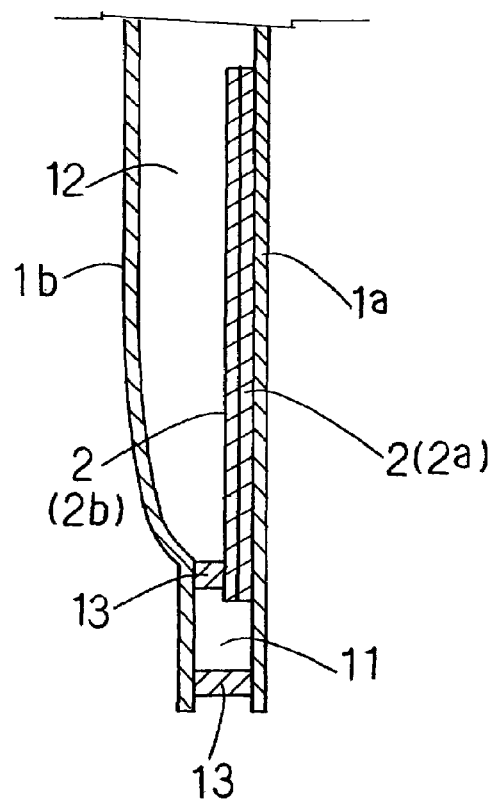

Herein, leaving the air passage 21 open may be achieved by widening the interval between the one valve sheet 2*a* and the other valve sheet 2*b* under the influence of an air-flow from the air introduction passage 11 at the expansion part 12. And, closing of the air passage 21 may be achieved, as shown in FIG. 3(C), by close fitting of the one valve sheet 2*a* and the other valve sheet 2*b* owing to air pressure inside the expansion part 12 when said air-flow does not occur.

In addition, other arrangements may be practicable such that the air passage 21 may be opened by inserting a rod-like element such as a straw into the air passage 21.

As shown in FIG. 2, the open/close valve 2 is formed with a static seal part 3. FIG. 2(B) illustrates the static seal part 3 that consists of a valve-side static seal part 3*a* for sealing the valve sheets 2*a*, 2*b* and bag-side static bonded part 3*b* for sealing the one bag sheet 1*a* and the other bag sheet 2*a*. Thus, an air passage 21 in the open/close valve 2 is, between the one valve sheet 2*a* and the other valve sheet 2*b*, defined where the bag-side static seal part 3*b* is not formed.

In this embodiment, as shown in FIG. 2(A), as valve-side static seal part 3*a* of the static seal part 3, a narrowing portion 31 (31*a*), a bypassing portion 32 (32*a*), and deriving portions 33, 34 (33*a*, 34*a*) are respectively formed in backward order from the air inlet 12*a*.

A pair of narrowing portion 31 (31*a*) in this embodiment, of linear seal with an angle to the crosswise direction W, are symmetrically formed, and the width (in a direction L) of the air passage 21 becomes gradually narrower backward in this area. That is, at the narrowing portion 31 (31*a*), an air-flow in the direction into the expansion part 12 passes from a wide side of the air passage 21 to the narrowing portion 31 (31*a*), while an air-flow in the reverse direction goes into from a narrow side, thereof, thereby functioning to prevent a reverse air-flow.

Behind the narrowing portions 31 (31*a*), a bypassing portion 32 (32*a*) is formed. This bypassing portion 32 (32*a*) is shaped substantially like a depicted heart in such a manner that its width becomes gradually wider backward. The air passage 21 is divided right and left by the bypassing portion 32 (32*a*). Accordingly, air passing through the narrowing portion 31 (31*a*) flows rounding the bypassing portion 32 (32*a*). At the bypassing portion 32 (32*a*), an air-flow in the direction into the expansion part 12 also passes smoothly to the shape of the bypassing portion 32 (32*a*), while an air-flow in the reverse direction ends in colliding the bypassing portion 32 (32*a*) (especially the widest part thereof) and being divided into right and left sides, thereby not directly flowing into the narrowing portions 32 (31*a*).

Behind the bypassing portion 32 (32*a*), a set of deriving portions 33, 34 (33*a*, 34*a*) of short linear seal is formed. In this embodiment, in the middle of the direction L in the open/close valve 2 is formed a first deriving portion 33 (33*a*) that is relatively long extending in the crosswise direction W, and at the right and left sides thereof is respectively formed a second deriving portions 34 that is relatively short extending in the direction L, wherein a gap between each of said deriving portions defines the air passage 21 through which an air-flow passes toward the expansion part 12. The deriving portions 33, 34 are positioned at the backmost of the open/close valve 2, and divide the air passage 21 into a plurality of narrow paths (four paths in this embodiment). This makes it difficult for an air-flow (a reverse flow) from the expansion part 12 toward the air passage 21 to go into the air passage 21, thereby achieving a shutoff of the reverse air-flow to some extent.

Of the static seal part 3 formed as set forth, the valve-side static seal part 3*a* bypasses and guides the air-flow passing from the air introduction passage 11 to the expansion part 12 in the open/close valve 2. Thanks to this, air tends to flow smoothly into the expansion part 12 through the air passage 21, and, furthermore, the shapes of the narrowing portion 31 and the bypassing portion 32, both of which are described above, and the existence of the deriving portions 33, 34 may, in this embodiment, rarely cause a reverse air-flow.

Even when a reverse air-flow is about to occur in the expansion part 12, an open portion which serves as entrance to the air passage 21 is cut off by the function of said deriving portions 33, 34, thus the air will not flow into the air passage 21, but into an area between the open/close valve 2 and the bag seat 1*b*, thereby inflating the area as shown in FIG. 3(C). This inflation may let the bag sheet 2*a* and the valve sheet 2*b* fit closely and result in preventing a reverse air-flow more securely.

The bag-side static seal part 3*b* of the static seal part 3 is formed, as viewed from the above, in the same position as said valve-side static seal part 3*a*, and provision of the bag-side static seal portion 3*b* joins the one bag sheet 1*a* and the one valve sheet 2*a*. Thanks to this, the open/close valve 2 is fixed to the one bag sheet 1*a*.

In this embodiment, as a bag-side static seal part 3*b*, the narrowing portion 31 (31*b*), bypassing portion 32 (32*b*), and driving portions 33, 34 (33*b*, 34*b*) are disposed in order without leaving a large space therebetween in the crosswise direction W, so the open/close valve 2 can securely be fixed to the bag sheet 1*a* even when the expansion part 12 i filled with air and expanded as shown in FIG. 3(B). Additionally, the open/close valve 2 fixed as such can be pushed down, as shown in FIG. 3(C), onto the one bag sheet 1*a* at an area between the open/close valve 2 and the other bag sheet 1*b* by the pressure of the air filled in the expansion part 12, and the open/close valve 2, as soft material, may fit closely to the one bag sheet 1*a*.

Figure 7:
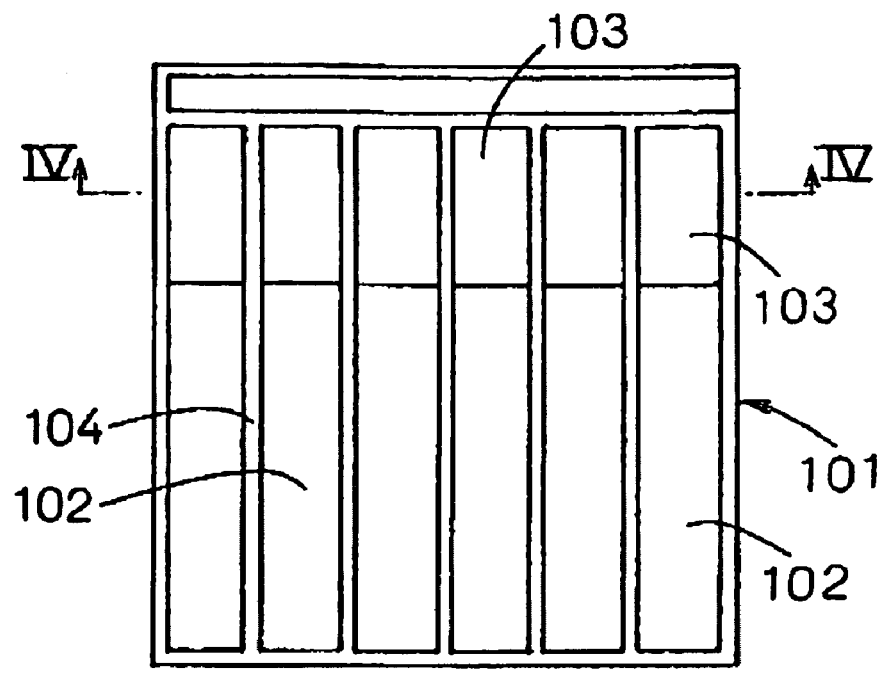
FIG. 7 illustrates an example of a conventional sealed body, FIG. 7(A) being a plan view, FIGS. 7(B) and 7(C) being perspective explanatory view of a state of the open/close valve, 7(D) and 7(E) being perspective views showing states of the open/close valves as taken along a line IV-IV of FIG. 7(A).
Figure 7:
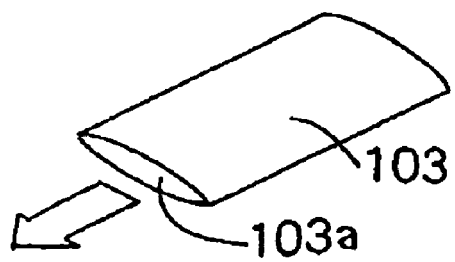
Figure 7:
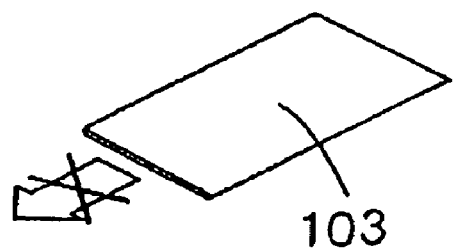
Figure 7:
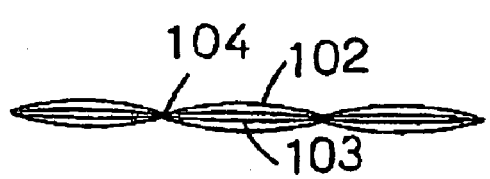
Figure 7:
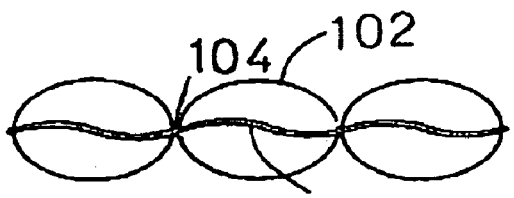

Thus, unlike the conventional open/close valve 103 (shown in FIG. 7(E)) that separates from the sheet of the expansion part 102 and has wrinkles through which the air will leak, the air passage 21 may be shut effectively.

Next, a processing procedure will be described by way of example with reference to the embodiment of a device for manufacturing a sealed body with an open/close valve in accordance with the present invention.

A manufacturing device 5 of this example, as shown in FIG. 4, comprises a sheet-feeding means 51, a sheet forwarding means 52, a static seal part forming means 53, a sheet-feeding rate adjusting means 54, a crosswise seal forming means 55, and a side seal forming means 56.

As for the valve sheets 2*a*, 2*b*, the one valve sheet 2*a* is coated in advance with paint in a portion where heat-sealing is not applied, specifically an interposed portion in the side seal 13 to become an air inlet 12*a*, prior to setting said sheets on the sheet-feed means 51 in the device 5. Then, the valve sheets 2*a*, 2*b* laid one on top of another are wound into a roll, which is set on the sheet-feeding means 51 as raw material.

The sheet-feeding means 51 is intended to feed the bag sheets 1*a*, 1*b*, which have been wound in a roll as raw material, and the valve sheets 2*a*, 2*b* to respective means in the process. This feeding operation is performed by the sheet-feed means 52 such as a roller to feed the sheets in a longitudinal direction (direction L) in sequence.

Simple feeding of said sheets in the longitudinal direction (direction L) by the sheet-feeding means 52 may cause sealing deviation in the longitudinal direction (direction L).

Against such disadvantage, a sheet-feeding rate adjusting means 54 is provided in the process. This consists of a sensor 54a and an adjusting roller 54b.

The sensor 54a is constituted by a photoelectric tube in this embodiment, and acts to measure the distance between every ten static seal parts 3 that are to be formed later. According to the measurement results, micro adjustment control of the feeding rate of each sheet is achieved by moving the adjusting roller 54b upward or downward.

Figure 5:
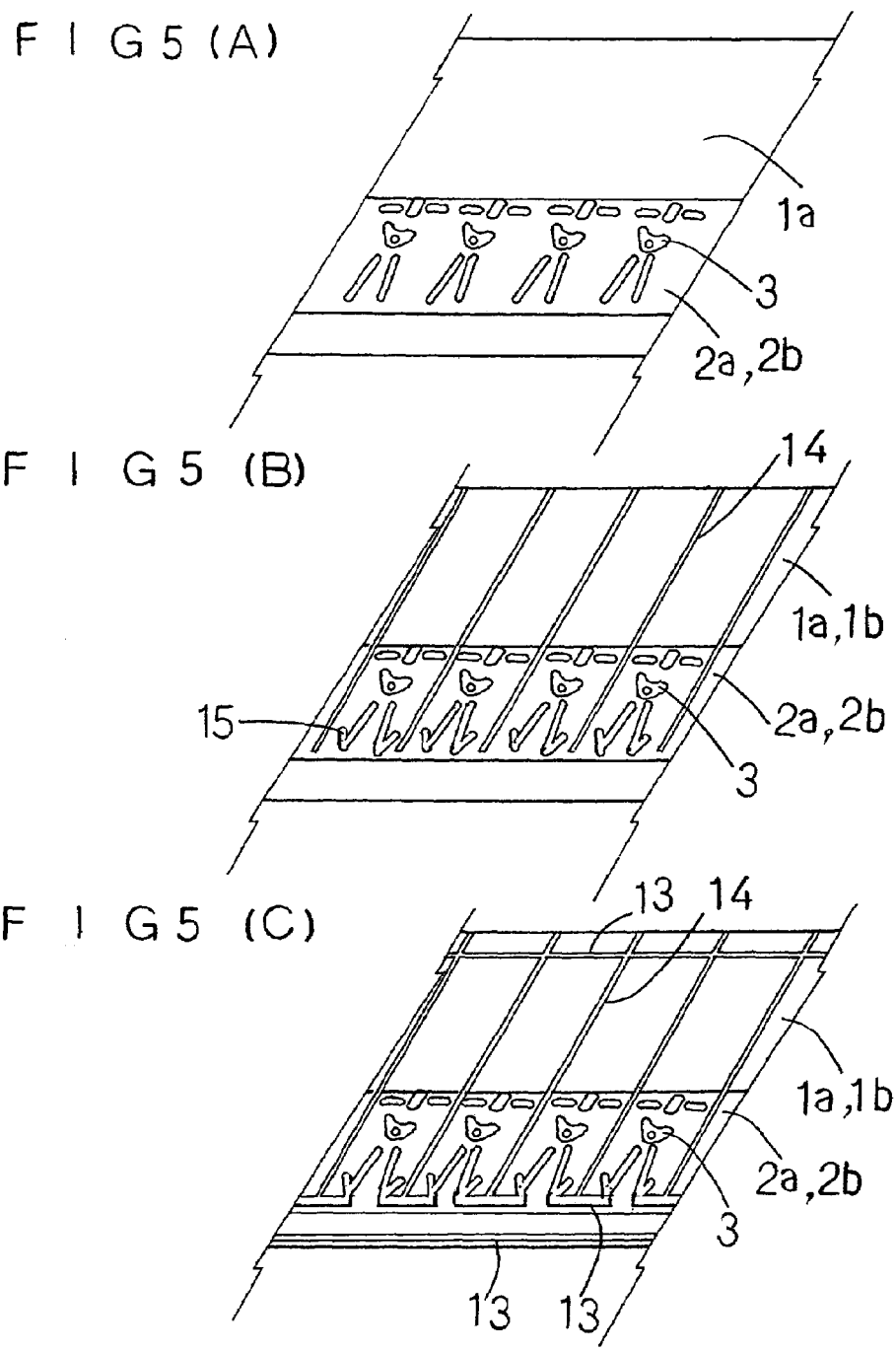
FIG. 5 is a perspective view showing a processing procedure of the sealed body of this embodiment, FIG. 5(A) showing a state where the static seal part is formed, FIG. 5(B) showing a state where the crosswise seal part and reinforcing seal part are formed, and FIG. 5(C) showing a state where the side seal part is formed.

In this embodiment, heat-sealing is employed as means for sealing the sheets. And this sealing is formed at three phases. First, as shown in FIG. 5(A), the static seal part forming means 53 forms a static seal part 3. Then, as shown in FIG. 5(B), the crosswise seal forming means 55 forms a crosswise seal part 14 and reinforcing seal 15. Next, as shown in FIG. 5(C), the side seal forming means 56 forms a side seal part 13.

Explanation will be made in accordance with the processing procedure.

Rolled sheets of raw materials are set on the sheet-feeding means 51. At this stage, the bag sheets 1a, 1b are separately set in a vertical direction so as to set the valve sheets 2a, 2b that have been laid one upon another and wound into a roll therebetween.

The one bag sheet 1a and the valve sheets 2a, 2b, laid one on top of another, have a static seal part 3 formed by the static seal part forming means 53, as shown in FIG. 5(A). This joins the one bag sheet 1a and the valve sheets 2a, 2b together.

By forming a static seal part 3 in this manner, even when the expansion part 12 in the finished sealed body 1 is filled and inflated with air, as shown in FIG. 3(B), the open/close valve 2 may be securely fixed to the one bag sheet 1a and close the air passage 21 effectively. Also, a configuration of the static seal part 3 is supposed to prevent a reverse air-flow in the open/close valve 2.

Then, the one bag sheet 1a and the valve sheets 2a, 2b which have been united by the static seal part 3 as described above, are forwarded to the sheet-feeding rate adjusting means 54.

The sheets 1a, 2a, 2b and the other bag sheet 2b are laid one on top of another, and, as shown in FIG. 5(B), have a crosswise seal and reinforcing seal formed by the crosswise seal forming means 55. Subsequently, the integrated sheet have a side seal formed by the side seal forming means 56, as shown in FIG 5(C), completing a sealed body 1.

In the process to follow, though not shown, the sealed body 1 in a series may be wound up into a roll, or cut in an individual piece, folded, heat-sealed, and finished into a cushioning medium. A process for filling the expansion parts of the resultant cushion medium with air or for packing an article to be protected or of any other kinds may be added.

The present invention should not be restricted to the aforementioned embodiment, and wide variations may be carried out.

As for a structure of the open/close valve 2 in this embodiment, two valve sheets 2a, 2b are placed opposite and fitted closely to close the air passage 21. One valve sheet folded into the same structure as the above may be applicable. On the contrary, a combination of three or more sheets may be applicable. And other variations can be practicable.

Figure 6:
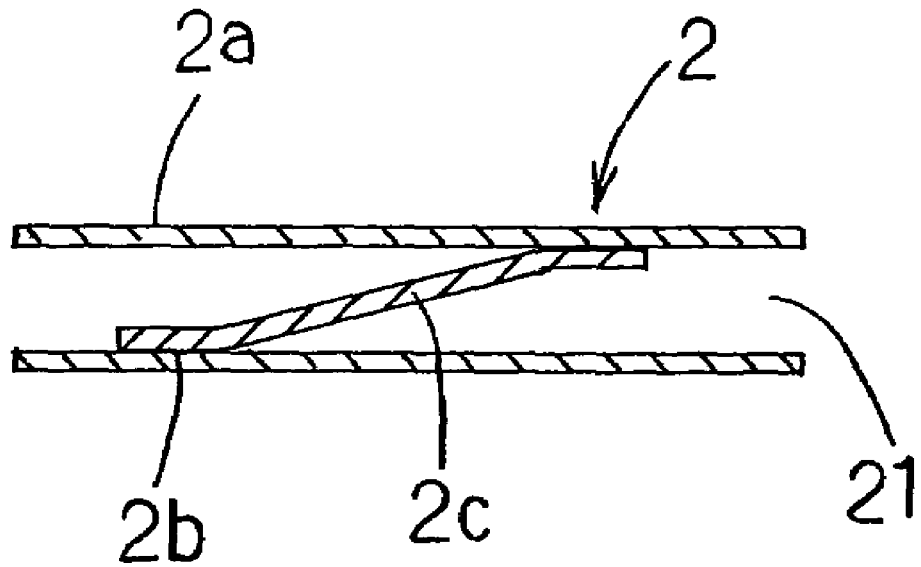
FIGS. 6 (A) and 6(B) are explanatory views showing a cross section of an open/close valve in accordance with further embodiments of the present invention.
Figure 6:
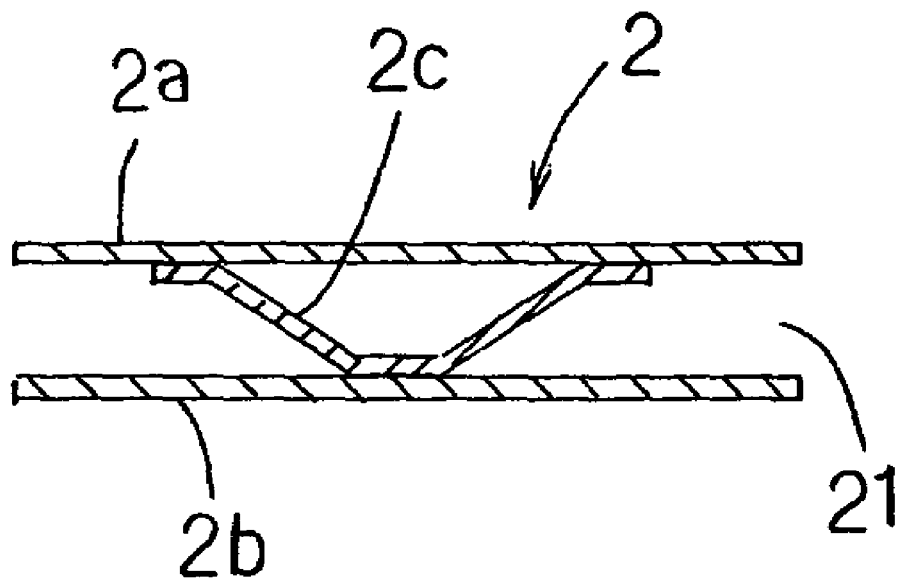

As shown in FIG. 6(A), an additional valve body sheet 2c positioned between the valve sheets 2a, 2b to be attached to one of the valve sheets 2a, 2b so as to be flappable, may act to close the air passage 21 by fitting closely to the valve sheet on the other side. This particular body valve sheet may not be limited to the type of acting only on one valve sheet, as shown in FIG. 6(A), but may be made to act on both sheets of the open/close valve 2, as shown in FIG. 6(B). The valve body sheet 2c may be varied into another embodiment, e.g. a plurality of valve body sheets 2c is practicable.

The present invention has the following effects based on the above-mentioned configuration.

In accordance with a first aspect of the present invention, an open/close valve may always fit closely to one of the sheets constituting the sealed body even when the sealed body is filled with air. As a result of it, the open/close valve securely contacts the sheet, and, since the contacting open/close valve as such is pressed to said sheet by air pressure inside the sealed body, wrinkles through which air can leak will not occur on the open/close valve, whereby the air passage is effectively closed.

In accordance with a second aspect of the present invention, besides the effect of the first aspect, the static seal part is supposed to bypass and guide the air-flow passing through the air passage of the open/close valve, and, making the configuration of the static seal part for an air-flow in the direction to coming into the sealed body to pass easily and otherwise for an air-flow in the reverse direction to be bypassed and guided, not to pass easily, may let the air pass in the air passage smoothly and let the reverse air-flow hardly occur.

In accordance with a third aspect of the present invention, besides the effect of the first or second aspect, in addition to an advantage that wrinkles through which air in the bag may leak are prevented from occurring on the open/close valve, since the valve sheet effectively closes the air passage, a mounting structure of the open/close valve where air leakage is hard to be taken place is provided.

In accordance with a fourth aspect of the present invention, a device for manufacturing a sealed body with the open/close valve that may avoid air leakage through the air passage of the open/close valve is provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mounting structure of an open/close valve in a sealed body, wherein the open/close valve is mounted in the sealed body, comprises two soft resin sheets and allows air to be filled therein, thereby being able to communicate the inside and outside of the sealed body through an air passage formed in the open/close valve, wherein:

the open/close valve, by overlying and partially bonding opposite soft resin sheets, forms the air passage in a manner sandwiched by these sheets;

the air passage is closable by close fitting of the sheets;

a static seal part is formed in the open/close valve; and the open/close valve is laid upon one sheet constituting the sealed body and bonded thereto at the static seal part, and is not bonded to the other sheet at the static bonded part.

2. The mounting structure of an open/close valve in a sealed body as defined in claim 1, wherein:

a static seal part forms the air passage so as to bypass and guide air passing through the open/close valve and bonds the open/close valve to the sheet constituting the sealed body.

3. The mounting structure of an open/close vale in a sealed body as defined in claim 1, wherein:

the open/close valve has a valve body sheet between the opposite soft resin sheets to open and close the air passage.

4. The mounting structure of an open/close valve in a sealed body as defined in claim 2, wherein:
the open/close valve has a valve body sheet between the opposite soft resin sheets to open and close the air passage.

* * * * *

(12) EX PARTE REEXAMINATION CERTIFICATE (7702nd)
United States Patent
Koyanagi

(10) Number: US 7,249,612 C1
(45) Certificate Issued: Aug. 24, 2010

(54) MOUNTING STRUCTURE OF AN OPEN/CLOSE VALVE IN A SEALED BODY

(75) Inventor: Yoshihiro Koyanagi, Kashiwara (JP)

(73) Assignee: Kashiwara Seitai Co., Ltd., Kashiwara-shi, Osaka (JP)

Reexamination Request:
No. 90/009,485, Jul. 17, 2009

Reexamination Certificate for:
Patent No.: 7,249,612
Issued: Jul. 31, 2007
Appl. No.: 10/504,908
Filed: Aug. 18, 2004

(22) PCT Filed: Nov. 22, 2002

(86) PCT No.: PCT/JP02/12217

§ 371 (c)(1),
(2), (4) Date: Aug. 18, 2004

(87) PCT Pub. No.: WO2004/048077

PCT Pub. Date: Jun. 10, 2004

(51) Int. Cl.
*F16K 15/14* (2006.01)
*B65D 30/26* (2006.01)

(52) U.S. Cl. .................... 137/846; 137/843; 156/290; 383/3; 383/44

(58) Field of Classification Search .................... None
See application file for complete search history.

(56) References Cited

U.S. PATENT DOCUMENTS

| | | | |
|---|---|---|---|
| 4,288,014 A | 9/1981 | Evers | 226/44 |
| 5,405,479 A | 4/1995 | Anderson | 156/308.4 |
| 5,427,830 A | 6/1995 | Pharo | |
| 5,469,966 A | 11/1995 | Boyer | |
| 5,897,731 A | 4/1999 | Colson et al. | 156/197 |
| 6,033,502 A | 3/2000 | Coenen et al. | 156/64 |
| 2005/0244527 A1 | 11/2005 | Koyanagi et al. | 425/5 |

FOREIGN PATENT DOCUMENTS

| | | |
|---|---|---|
| EP | 689929 | 1/1996 |
| JP | 10-000706 A | 1/1998 |

*Primary Examiner*—Joseph A. Kaufman

(57) ABSTRACT

Provided is a mounting structure of an open/close valve in a sealed body, wherein the open/close valve 2 mounted in the sealed body comprising soft resin sheets and allowing air to be filled therein is stuck on one sheet constituting the expansion part 12 of the sealed body and is not stuck on the other sheet. Even when the expansion part 12 is filled with air, the open/close valve 2 is always fitted closely to the sheet consituting the expansion part 12, whereby the open/close valve 2 may not wrinkle and air may not leak through an air passage of the open/close valve 2.

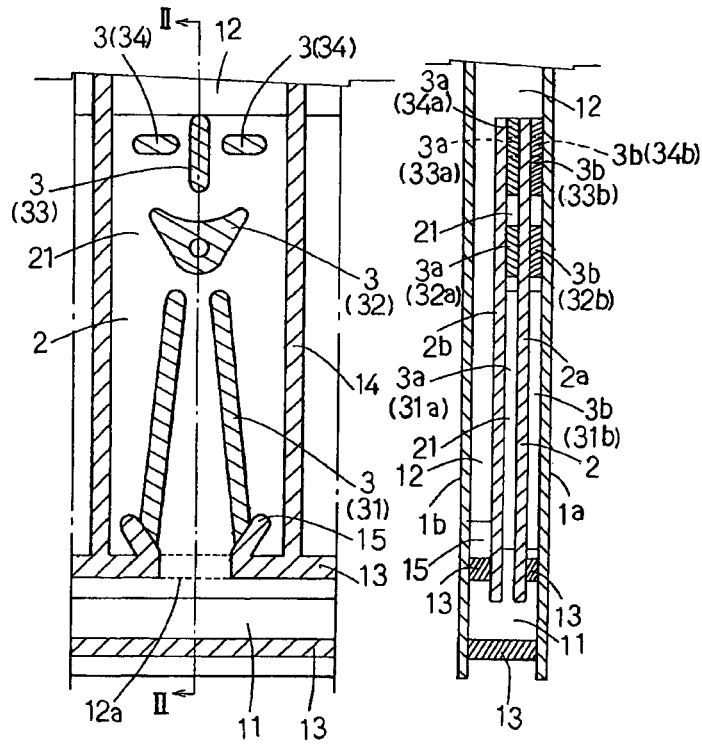

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 6, line 10-18:

Even when a reverse air-flow is about to occur in the expansion part 12, an open portion which serves as entrance to the air passage 21 is cut off by the function of said deriving portions 33, 34, thus the air will not flow into the air passage 21, but into an area between the open/close valve 2 and the bag [seat] *sheet* 1b, thereby inflating the area as shown in FIG. 3(C). This inflation may let the [bag] *valve* sheet 2a and the valve sheet 2b fit closely and result in preventing a reverse air-flow more securely.

Column 5, line 27-36:

A pair of narrowing portion 31 (31a) in this embodiment, of linear seal with an angle to the crosswise direction W, are symmetrically formed, and the width (in a direction L) of the air passage 21 becomes gradually narrower backward in this area. That is, at the narrowing portion 31 (31a), an air-flow in the direction into the expansion part 12 passes from a wide side of the air passage 21 to the narrowing portion 31 (31a), while an air-flow in the reverse direction goes into from a narrow side[,] thereof, thereby functioning to prevent a reverse air-flow.

AS A RESULT OF REEXAMINATION, IT HAS BEEN DETERMINED THAT:

Claims 2 and 4 are cancelled.

Claims 1 and 3 are determined to be patentable as amended.

New claims 5-8 are added and determined to be patentable.

1. A mounting structure of an open/close valve in a sealed body, wherein the open/close valve is mounted in the sealed body[,] *that* comprises two soft resin *bag* sheets and allows air to be filled therein, thereby being able to communicate the inside and outside of the sealed body through an air passage formed in the open/close valve, wherein:

the open/close valve, by overlying and partially bonding opposite soft resin *valve* sheets, forms the air passage in a manner sandwiched by [these] *the valve* sheets;

the air passage *through which air flows from an air inlet* is closable by close fitting of the *valve* sheets, *close fitting of the valve sheets resulting in preventing a reverse air-flow*;

a static seal part is formed in the open/close valve; [and]

the open/close valve is laid upon one [sheet] *of the bag sheets* constituting the sealed body and *is* bonded [thereto] *to the one of the bag sheets* at the static seal part, and is not bonded to the other [sheet] *of the bag sheets* at the static bonded part;

the static seal part forms the air passage so as to bypass and guide air passing through the open/close valve, bonds the open/close valve to the one of the bag sheets constituting the sealed body, and includes a deriving portion; and the deriving portion is positioned at the backmost of the open/close valve, and divides the air passage into a plurality of narrow paths narrower than the air passage.

3. The mounting structure of an open/close vale in a sealed body as defined in claim 1, wherein: the open/close valve has a valve body sheet between the opposite soft resin *valve* sheets to open and close the air passage.

5. *The mounting structure of an open/close valve in a sealed body as defined in as defined in claim 1, wherein:*

*a narrowing portion and a bypassing portion are formed in a backward order from the air inlet;*

*the narrowing portion is provided with a seal with an angle to a crosswise direction, and the width of the air passage becomes gradually narrower backward in which the narrowing portion is located;*

*the bypassing portion is formed behind the narrowing portions, and the air passage is divided right and left by the bypassing portion; and*

*air passing through the narrowing portion flows rounding the bypassing portion.*

6. *The mounting structure of an open/close valve in a sealed body as defined in claim 5, wherein: the open/close valve has a valve body sheet between the opposite soft resin valve sheets to open and close the air passage.*

7. *A mounting structure of an open/close valve in a sealed body, wherein the open/close valve is mounted in the sealed body that comprises two soft resin bag sheets and allows air to be filled therein, thereby being able to communicate the inside and outside of the sealed body through an air passage formed in the open/close valve, wherein:*

*the open/close valve, by overlying and partially bonding opposite soft resin valve sheets, forms the air passage in a manner sandwiched by the valve sheets;*

*the air passage through which air flows from an air inlet is closable by close fitting of the valve sheets, close fitting of the valve sheets resulting in preventing a reverse air-flow;*

*a static seal part is formed in the open/close valve;*

*the open/close valve is laid upon one of the bag sheets constituting the sealed body and is bonded to the one of the bag sheets at the static seal part, and is not bonded to the other of the bag sheets at the static bonded part;*

*a narrowing portion and a bypassing portion are formed in a backward order from the air inlet;*

*the narrowing portion is provided with a seal with an angle to a crosswise direction, and the width of the air passage becomes gradually narrower backward in which the narrowing portion is located;*

*the bypassing portion is formed behind the narrowing portions, and the air passage is divided right and left by the bypassing portion; and*

*air passing through the narrowing portion flows rounding the bypassing portion.*

8. *The mounting structure of an open/close valve in a sealed body as defined in claim 7, wherein: the open/close valve has a valve body sheet between the opposite soft resin valve sheets to open and close the air passage.*

\* \* \* \* \*

(12) EX PARTE REEXAMINATION CERTIFICATE (8839th)
United States Patent
Koyanagi

(10) Number: US 7,249,612 C2
(45) Certificate Issued: Jan. 31, 2012

(54) MOUNTING STRUCTURE OF AN OPEN/CLOSE VALVE IN A SEALED BODY

(75) Inventor: Yoshihiro Koyanagi, Kashiwara (JP)

(73) Assignee: Kashiwara Seital Co., Ltd., Kashiwara-Shi, Osaka (JP)

Reexamination Request:
No. 90/011,450, Jan. 21, 2011

Reexamination Certificate for:
Patent No.: 7,249,612
Issued: Jul. 31, 2007
Appl. No.: 10/504,908
Filed: Aug. 18, 2004

Reexamination Certificate C1 7,249,612 issued Aug. 24, 2010

(22) PCT Filed: Nov. 22, 2002

(86) PCT No.: PCT/JP02/12217
§ 371 (c)(1),
(2), (4) Date: Aug. 18, 2004

(87) PCT Pub. No.: WO2004/048077
PCT Pub. Date: Jun. 10, 2004

(51) Int. Cl.
*F16K 15/14* (2006.01)
*B65D 30/26* (2006.01)

(52) U.S. Cl. .................. 137/846; 137/843; 156/290; 383/3; 383/44

(58) Field of Classification Search .................. None
See application file for complete search history.

(56) References Cited

To view the complete listing of prior art documents cited during the proceeding for Reexamination Control Number 90/011,450, please refer to the USPTO's public Patent Application Information Retrieval (PAIR) system under the Display References tab.

*Primary Examiner* — Robert M. Fetsuga

(57) ABSTRACT

Provided is a mounting structure of an open/close valve in a sealed body, wherein the open/close valve 2 mounted in the sealed body comprising soft resin sheets and allowing air to be filled therein is stuck on one sheet constituting the expansion part 12 of the sealed body and is not stuck on the other sheet. Even when the expansion part 12 is filled with air, the open/close valve 2 is always fitted closely to the sheet consituting the expansion part 12, whereby the open/close valve 2 may not wrinkle and air may not leak through an air passage of the open/close valve 2.

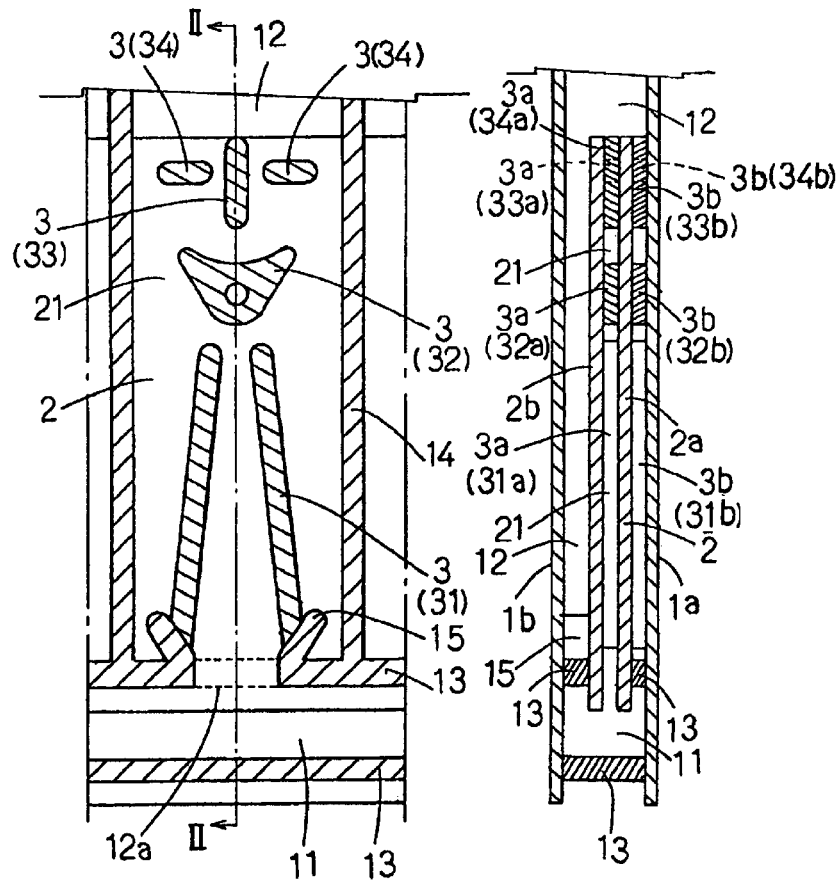

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 4 were previously cancelled.

Claims 1, 3 and 7 are determined to be patentable as amended.

Claims 5, 6 and 8, dependent on an amended claim, are determined to be patentable.

New claims 9-11 are added and determined to be patentable.

1. A mounting structure of an open/close valve in a sealed body, wherein the open/close valve is mounted in the sealed body that comprises two soft resin bag sheets and allows air to be filled therein, thereby being able to communicate the inside and outside of the sealed body through an air passage formed in the open/close valve, wherein:
   the open/close valve, by overlying and partially bonding opposite soft resin valve sheets, forms the air passage in a manner sandwiched by the valve sheets;
   the air passage through which air flows from an air inlet is closable by close fitting of the valve sheets, close fitting of the valve sheets resulting in preventing a reverse air-flow;
   a static seal part is formed in the open/close valve;
   the open/close valve is laid upon one of the bag sheets constituting the sealed body and is bonded to the one of the bag sheets at the static seal part, and is not bonded to the other of the bag sheets at the static bonded part;
   the static seal part forms the air passage so as to bypass and guide air passing through the open/close valve, bonds the open/close valve to the one of the bag sheets constituting the sealed body, and includes a deriving portion; [and]
   the deriving portion is positioned at the backmost of the open/close valve, and divides the air passage into a plurality of narrow paths narrower than the air passage; *and*
   *the deriving portion includes a valve-side deriving portion and a bag-side deriving portion respectively located on opposite sides of one of the valve sheets, the valve-side deriving portion is located inside of the open/close valve and directly bonds the valve sheets, and the bag-side deriving portion is located outside of the open/close valve and directly bonds the one of the valve sheets and the one of the bag sheets.*

3. The mounting structure of an open/close [vale] *valve* is a sealed body as defined in claim 1, wherein: the open/close valve has a valve body sheet between the opposite soft resin valve sheets to open and close the air passage.

7. A mounting structure of an open/close valve in a sealed body, wherein the open/close valve is mounted in the sealed body that comprises two soft resin bag sheets and allows air to be filled therein, thereby being able to communicate the inside and outside of the sealed body through an air passage formed in the open/close valve, wherein:
   the open/close valve, by overlying and partially bonding opposite soft resin valve sheets, forms the air passage in a manner sandwiched by the valve sheets;
   the air passage through which air flows from an air inlet is closable by close fitting of the valve sheets, close fitting of the valve sheets resulting in preventing a reverse air-flow;
   a static seal part is formed in the open/close valve;
   the open/close valve is laid upon one of the bag sheets constituting the sealed body and is bonded to the one of the bag sheets at the static seal part, and is not bonded to the other of the bag sheets at the static bonded part;
   a narrowing portion and a bypassing portion are formed in a backward order from the air inlet;
   the narrowing portion is provided with a seal with an angle to a crosswise direction, and the width of the air passage becomes a gradually narrower backward in which the narrowing portion is located;
   the bypassing portion is formed behind the narrowing portions, and the air passage is divided right and left by the bypassing portion;
   *the bypassing portion includes a valve-side bypassing portion and a bag-side bypassing portion respectively located on opposite sides of one of the valve sheets, the valve-side bypassing portion is located inside of the open/close valve and directly bonds the valve sheets, and the bag-side bypassing portion is located outside of the open/close valve and directly bonds the one of the valve sheets and the one of the bag sheets;* and
   air passing through the narrowing portion flows rounding the bypassing portion.

*9. The mounting structure of an open/close valve in a sealed body as defined in claim 5, wherein the narrowing portion includes a valve-side narrowing portion and a bag-side narrowing portion respectively located on the opposite sides of the one of the valve sheets, the valve-side narrowing portion is located inside of the open/close valve and directly bonds the valve sheets, and the bag-side narrowing portion is located outside of the open/close valve and directly bonds the one of the valve sheets and the one of the bag sheets.*

*10. The mounting structure of an open/close valve in a sealed body as defined in claim 9, wherein the bypassing portion includes a valve-side bypassing portion and a bag-side bypassing portion respectively located on the opposite sides of the one of the valve sheets, the valve-side bypassing portion is located inside of the open/close valve and directly bonds the valve sheets, and the bag-side bypassing portion is located outside of the open/close valve and directly bonds the one of the valve sheets and the one of the bag sheets.*

*11. The mounting structure of an open/close valve in a sealed body as defined in claim 7, wherein the narrowing portion incudes a valve-side narrowing portion and a bag-side narrowing portion respectively located on the opposite sides of the one of the valve sheets, the valve-side narrowing portion is located inside of the open/close valve and directly bonds the valve sheets, and the bag-side narrowing portion is located outside of the open/close valve and directly bonds the one of the valve sheets and the one of the bag sheets.*

\* \* \* \* \*